Patented Sept. 16, 1924.

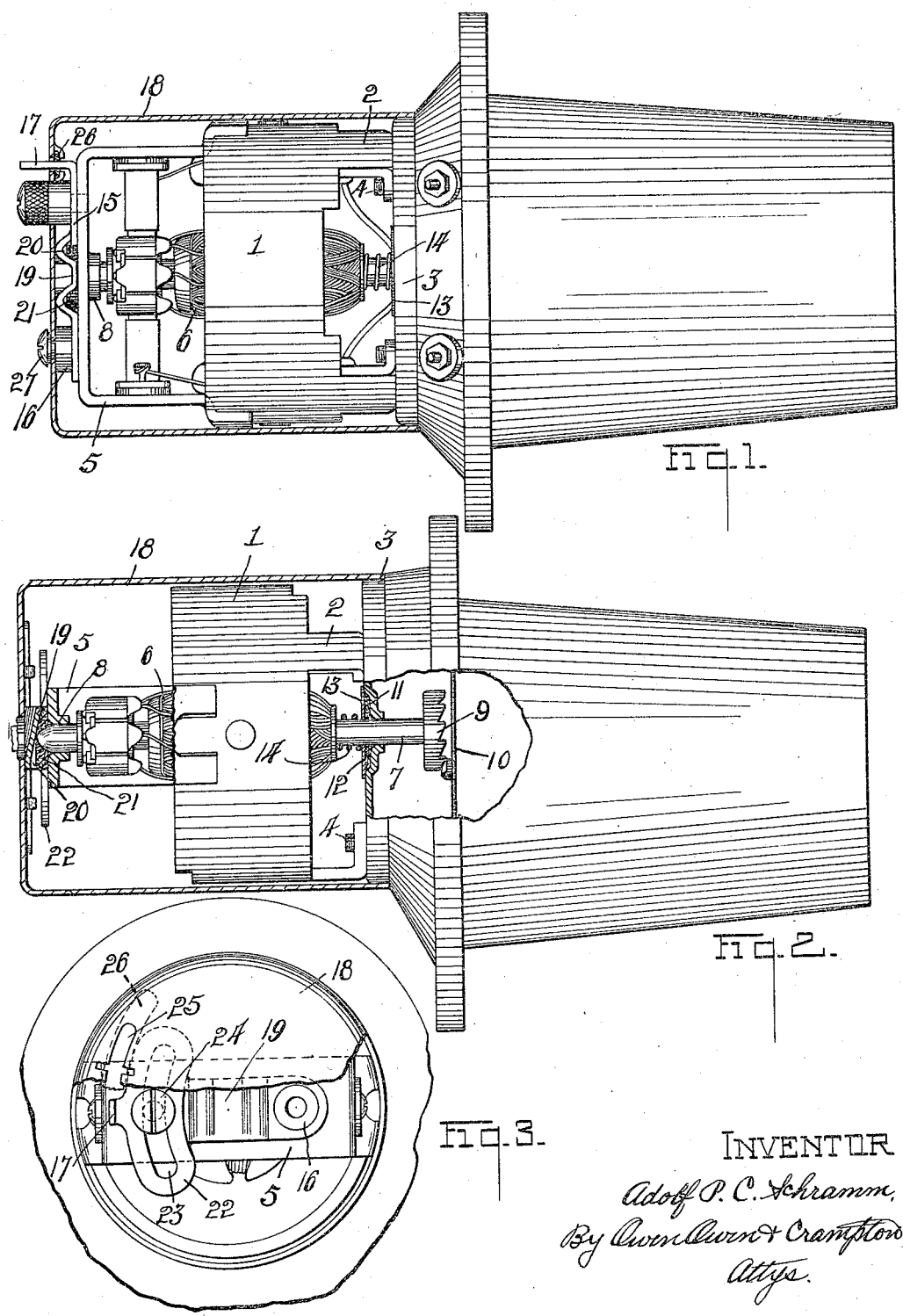

1,508,824

UNITED STATES PATENT OFFICE.

ADOLF P. C. SCHRAMM, OF NEW YORK, N. Y., ASSIGNOR TO UNITED ELECTRICAL MANUFACTURING COMPANY, OF ADRIAN, MICHIGAN, A CORPORATION OF MICHIGAN.

ADJUSTABLE THRUST BEARING.

Application filed July 31, 1922. Serial No. 578,529.

*To all whom it may concern:*

Be it known that I, ADOLF P. C. SCHRAMM, a citizen of the United States, and a resident of New York, in the county of New York and State of New York, have made an Invention Appertaining to an Adjustable Thrust Bearing; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to thrust bearings for horns or signal devices of the motor actuated type and particularly to those employing a diaphragm and a rapidly driven rotatable member for effecting a sound emitting vibration thereof.

An object of the invention is the provision of highly efficient and novel means for use as a thrust bearing for the motor armature shaft and which is capable of easy and quick adjustment from without the horn casing to adjust the pressure of the shaft in the diaphragm. Further objects and advantages of the invention will be apparent from the following detailed description thereof.

While the invention in its broader aspect is capable of embodiment in numerous forms, a preferred embodiment thereof is illustrated in the accompanying drawings, in which,—

Figure 1 is a side elevation of a motor horn embodying the invention with the motor casing in section. Fig. 2 is a different side view thereof with parts broken away and in section, and Fig. 3 is an end view of the device with parts broken away.

Referring to the drawings, 1 designates the field magnet of an electric motor, which magnet, in the present instance, is of circular form and provided at one end with three or more legs 2 for mounting on a base member 3 to which they are secured by screws 4, or in any other suitable manner. The opposite or rear end of the magnet 1 is provided with a U-shaped bearing frame 5, with the cross member thereof disposed diametrically of the magnet 1 in outwardly spaced relation to the adjacent end thereof. The motor armature 6 is mounted within the field frame 1 axially thereof in the usual or any suitable manner and its shaft 7 has one end extended through and journaled in a central bearing 8 in the cross member of the bearing 5, while the other or forward end of the shaft projects through a bearing in the base member 3 and is provided with a serrated wheel 9 for coaction with the horn diaphragm 10 in the usual or any suitable manner for imparting a sound emitting vibration to the diaphragm when the shaft is rotated, as well understood in the art.

In accomplishing one of the features of my invention the portion of the base member 3 in which the shaft 7 has its bearing is counter-sunk or depressed, preferably forwardly or away from the adjacent end of the armature 6 to form a shallow pocket 11 in the base member around the shaft to receive a lubricant carrying washer 12 of felt or other suitable material. This washer has engagement with the shaft entirely around the same and is of a thickness to adapt it to seat in the recess 11 with its outer side substantially flush with the adajacent outer side of the base member 3. A washer 13 of metal or other suitable rigid material is mounted on the shaft at the outer open end of the pocket 11 and is of a size to span the pocket and rest at its edge against the marginal edge wall thereof, as shown in Fig. 2, thereby serving as a closure for the outer end of the pocket. A coiled compression spring 14 encircles the shaft 7 intermediate the washer 13 and adjacent end of the armature 6 and serves to yieldingly hold said washer to its seat.

It is evident that the base member 3 and washer 13 cooperate to form a complete housing for enclosing the felt or lubricating washer 12, thus preventing evaporation of the lubricant from the washer, keeping the lubricating washer clean from dust and grit, and preventing the lubricant from running out of the washer when the horn is mounted under the hood of an automobile where it is exposed to high temperatures. It is found in practice that this manner of lubricating the front bearing of a motor horn and protecting the lubricating means obviates many of the objections incident to horns of this character, and that the initial lubricating of such bearing will last indefinitely without further attention. Dry front bearings are one of the frequent causes of automobile horns being out of order, as a dry bearing at this point causes the motor to stop or reduce the number of revolutions to such an extent that only an insufficient sound is emitted by the horn.

Another feature of the invention consists in the provision of a shaft adjusting lever 15 in coaction with the outer or rear end of the armature shaft 7 and operable to adjust the pressure of the wheel 9 against the diaphragm. This lever is mounted on the bearing frame 5 at the outer side of its cross member, being fulcrumed at one end to the cross member at one side of the bearing 8 by a rivet or fulcrum member 16. The opposite end of the lever is provided with an out-turned finger 17, which projects outwardly through the outer end of the enclosing case or shell 18 for the motor to facilitate adjustment of the lever from without the shell. The lever at a point in register with the adjacent end of the shaft 7 is provided with an inclined transversely extending portion 19, which is intended to bear against the shaft end and to effect an axial adjustment of the shaft upon a transverse adjusting movement of the lever, as is apparent. The coacting end of the armature shaft is made pointed so that it has a single point contact with the thrust portion 19 of the lever. The lever 15 at the sides of the inclined portion 19 is shown as being outwardly looped to form a pocket 20 in surrounding relation to the adjacent end of the armature shaft for receiving a lubricating washer 21 of felt or other suitable material. This washer encircles the end of the shaft in lubricating contact therewith and is held to the outer end surface of the bearing 8 or to the outer side of the frame 5 by the lever 15.

The lever 15 near its free end is provided with broadened portions 22 having a segmental slot 23 therein and adapted to receive a binding or locking screw 24, the shank of which extends through the slot and threads into the frame 5. The head of this screw projects out through a registering opening in the outer end of the shell 18 and is shown as knurled to facilitate a turning thereof without the shell. The finger 17 of the adjusting lever projects through a segmental slot 25 in the end of the shell 18 and through a small opening in a guard plate 26, which is held in longitudinal sliding engagement with the inner side of the shell and maintains the slot 25 closed in any position of adjustment of the lever. The shell 18 is held in position around the motor by a screw 27, which projects through an opening in the outer end of the shell and threads, in the present instance, into the fulcrum member 16 for the lever.

It is evident that the rear end of the armature shaft 7 is continually held in thrust engagement with the inclined surface of the adjusting lever both by the action of the spring 14 and by the pressure of the diaphragm against the wheel 9, thus requiring an efficient lubricating of the shaft at such point, which is efficiently taken care of by my end lubricating means.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent is,—

1. In combination, a shaft, a frame member disposed crosswise of the shaft and having a bearing opening through which an end of the shaft projects, a lever disposed lengthwise of the frame member and fulcrumed for movements transversely thereof, said lever having a transversely inclined portion for end bearing coaction with the adjacent end of the shaft.

2. In combination, a shaft, a frame member disposed crosswise of the shaft and having a bearing opening through which an end of the shaft projects, a lever disposed lengthwise of the frame member and fulcrumed for movements transversely thereof, said lever having a transversely inclined portion for end bearing coaction with the adjacent end of the shaft, and lubricating means for the shaft held in position by said lever.

3. In combination, a shaft, a frame member disposed transverse to the shaft and having a bearing opening through which an end of the shaft projects, means carried by the frame member for transverse adjustment relative to the shaft and having a tapered portion for end thrust coaction with the shaft adapted to axially adjust the shaft when the means is adjusted.

4. In combination, a shaft, a cross frame member having a bearing opening therethrough through which an end of the shaft projects, and an element carried by the frame member for end thrust coaction with the shaft end and transversely adjustable relative to the frame member to axially adjust the shaft, and fibrous lubricating means held to the shaft by the element.

5. In combination, a shaft, a frame member disposed transverse to the shaft and having a bearing opening through which an end of the shaft projects, means carried by the frame member for transverse adjustment relative to the shaft and having a tapered portion for end thrust coaction with the shaft adapted to axially adjust the shaft when the means is adjusted, and a fibrous lubricating washer encircling the shaft and held in lubricating relation to the shaft by said means.

6. In combination, a shaft, a cross frame member having a bearing opening through which an end of the shaft projects, and an element carried by the frame member for adjustment transversely of the shaft and having a thrust portion for the adjacent end of the shaft, which portion is tapered in the direction of adjustment of the element to effect an axial adjustment of the shaft when the element is adjusted.

7. In combination, a shaft, a cross frame member having a bearing opening through which an end of the shaft projects, an element carried by the frame member for adjustment transversely of the shaft and having a thrust portion for the adjacent end of the shaft, which portion is tapered in the direction of adjustment of the element to effect an axial adjustment of the shaft when the element is adjusted, said element cooperating with the frame member to form a pocket around the shaft end, and a lubricating washer encircling the shaft within the pocket and held in position by the element.

8. In combination, a shaft having an axially pointed end, a cross frame bearing part having a bearing opening through which the pointed end of the shaft projects, and a lever fulcrumed to the frame part for adjustment transversely of the shaft and having a tapered portion disposed without the pointed shaft end in end thrust coaction therewith and adapted to axially adjust the shaft when the lever is adjusted.

9. In combination, a shaft having an axially pointed end, a cross frame bearing part having a bearing opening through which the pointed end of the shaft projects, and a lever fulcrumed to the frame part for adjustment transversely of the shaft and having a tapered portion disposed without the pointed shaft end in end thrust coaction therewith and adapted to axially adjust the shaft when the lever is adjusted, said lever forming a pocket in surrounding relation to the adjacent shaft end, and a lubricating washer disposed in the lever pocket and held in lubricating relation to the shaft by the lever.

In testimony whereof I have hereunto signed my name to this specification.

ADOLF P. C. SCHRAMM.